Aug. 23, 1966  A. BERTUZZI  3,267,838
MACHINE FOR EXTRACTING JUICES FROM CITRUS FRUITS
Filed May 26, 1964  5 Sheets-Sheet 1

Alberto Bertuzzi
Inventor
Scrivener Parker
Scrivener & Clarke
attys

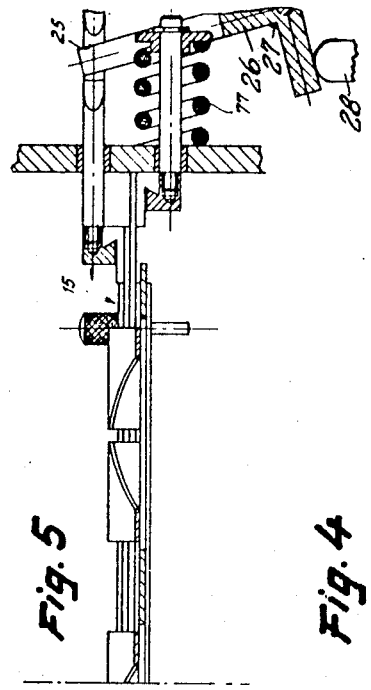
Fig. 5
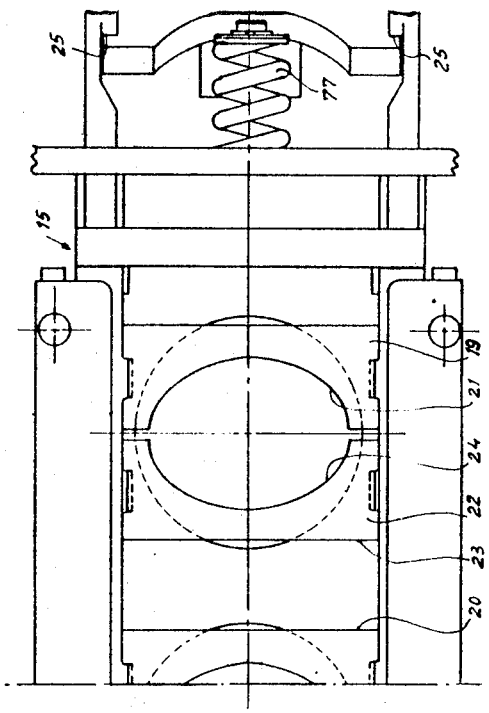
Fig. 4
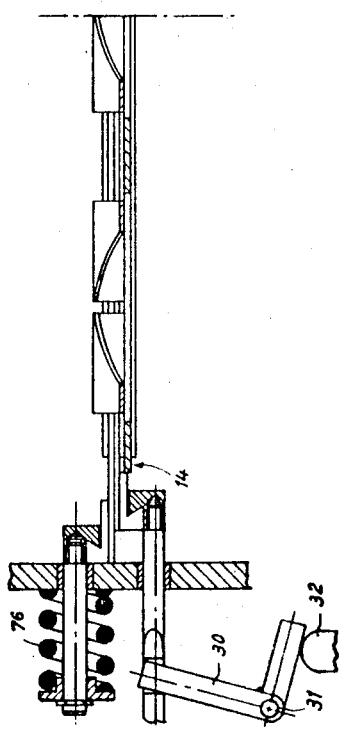
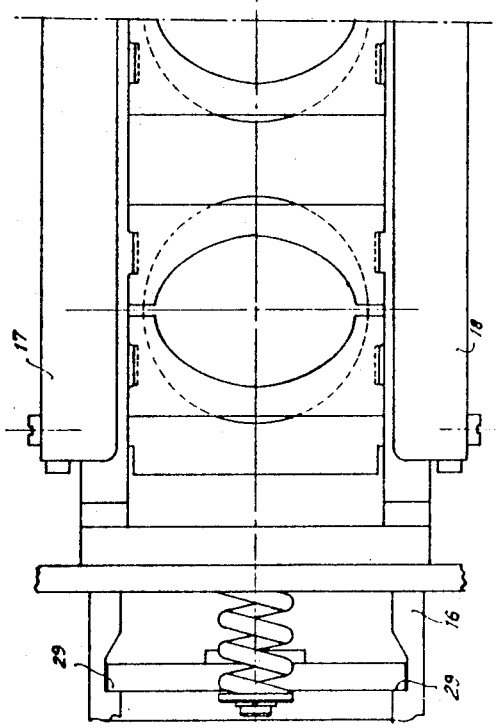

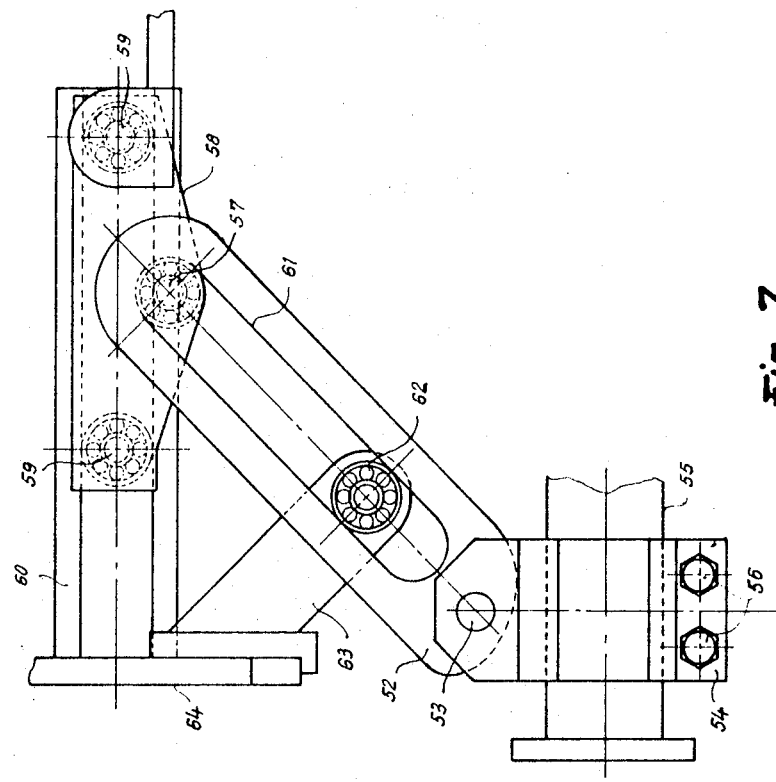
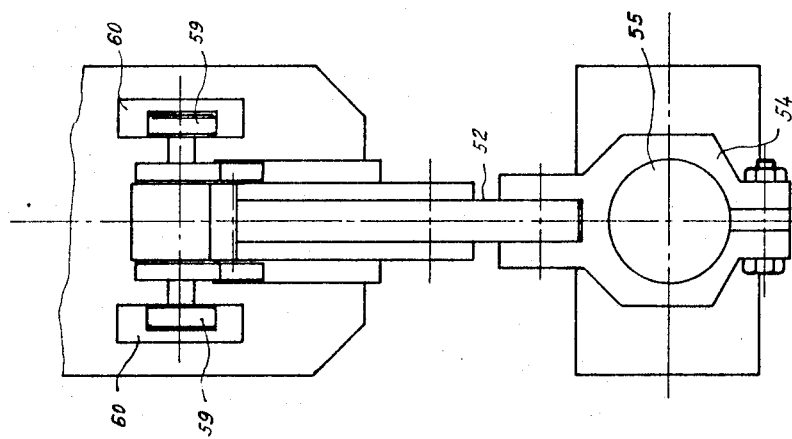

United States Patent Office 3,267,838
Patented August 23, 1966

3,267,838
MACHINE FOR EXTRACTING JUICES FROM CITRUS FRUITS
Alberto Bertuzzi, Via G. Marcora 11, Milan, Italy
Filed May 26, 1964, Ser. No. 370,265
Claims priority, application Italy, Oct. 10, 1963,
20,690/63
3 Claims. (Cl. 100—97)

This invention relates to machines for extracting juices from citrus fruits.

The machines manufactured at present for extracting juices from citrus fruits which have been cut in two halves, are realized and constructed on the basis of two discrete squeezing principles.

The first of them is based on the action exerted by a specially shaped member referred to as a bulb which has a straight reciprocating motion penetrating the half fruits to squeeze the juice therefrom and subsequently leaving the squeezed half fruits.

The second principle is based on the action exerted again by a bulb, but having, in addition to a straight reciprocating motion, also a continuous rotary motion.

The machines provided with squeezing members having only a straight reciprocating motion allow to have a good quality juice (little aired, little pulpy, without bitter substances), but with a poor percent yield.

The machines instead with squeezing members having a dual motion, i.e. a straight reciprocating motion and a continuous rotary motion, allow to obtain a juice of a lower quality as compared with the first one, but with a higher percent yield. In fact in such machines the squeezing members are rotating at high speeds causing a high aeration, breaking of the seeds and extraction of bitter substances from the epicarp tissues.

It is an object of this invention to obviate the drawbacks and limitations of the two above mentioned squeezing methods.

More particularly the machine according to the invention is devised in such a manner as to allow to achieve the advantages of both above said methods (good quality and high percent yield) without undergoing the above mentioned drawbacks.

The machine according to the invention is characterized in that its squeezing members have, in addition to a straight reciprocating motion, also a slow rotary reciprocating motion, the rotation being stopped during or at the end of the squeezing step. Such rotary movement can be also limited to a fraction of a revolution.

The machine draws inspiration substantially from the manual juice extraction method, as it is practiced. In the manual extraction the half fruit to be squeezed is compressed on the bulb by exerting simultaneously a slow rotary action by hand. It is even the combined action involving a compression and a slow partial rotation with a stop that allows to achieve the maximum yield and the best quality.

This combination of mechanical actions is indeed provided in the machine according to the invention.

These and other features and advantages of the invention will be better understood from the following detailed description, which is given however by way of example only and therefore not in a limiting sense, of an embodiment of the invention, referring to the accompanying drawings, wherein:

FIG. 4 is a plan view of a detail of FIG. 3;

FIG. 5 is a sectional front elevational view of the detail of FIG. 4;

FIG. 6 is a front elevational view of a driving mechanism for the squeezing devices, and FIG. 7 is an elevational view, with some parts in section, of the mechanism of FIG. 6.

Figure 1:
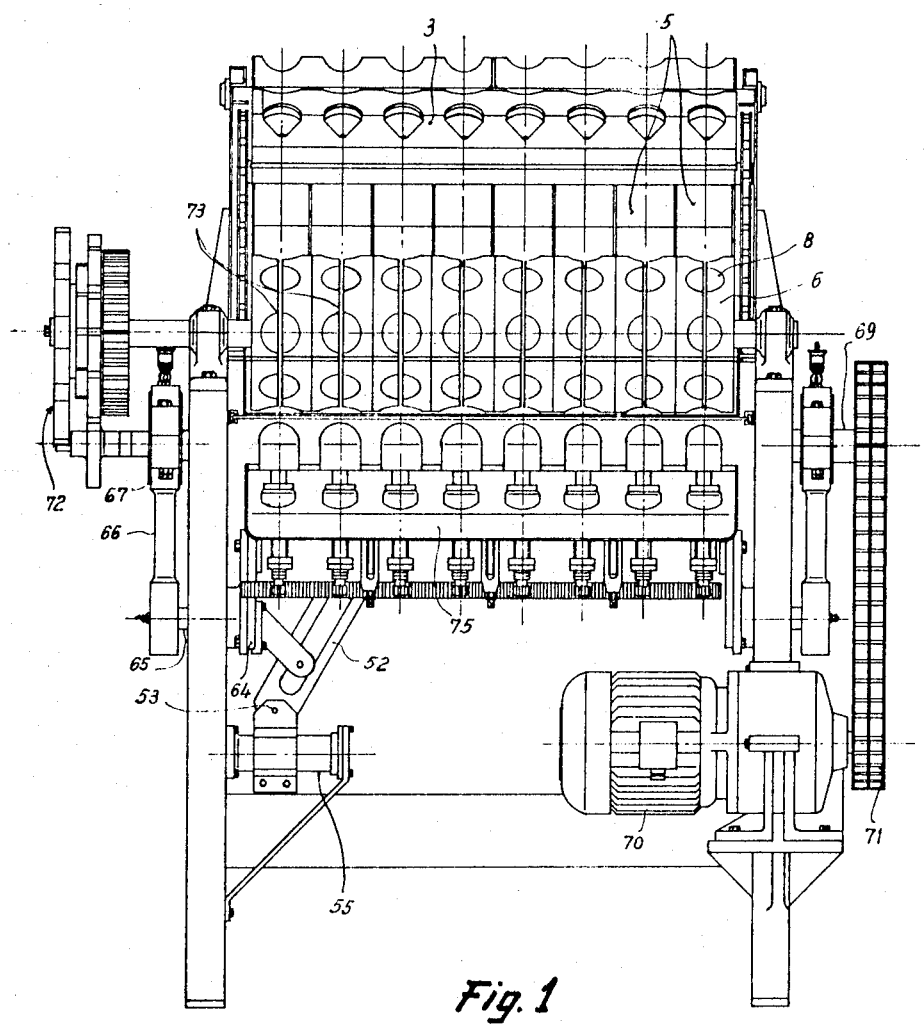
FIG. 1 is a front elevational view of the machine according to the invention.
Figure 2:
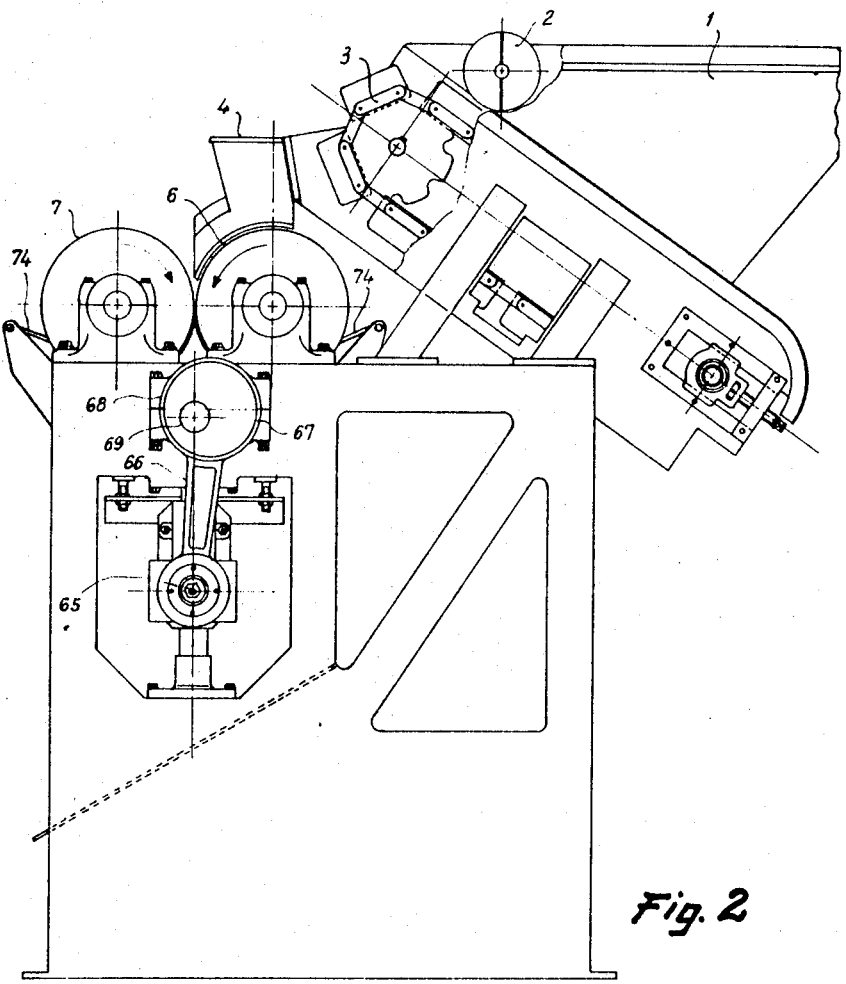
FIG. 2 is a side elevational view of the machine.

Referring first to FIGS. 1 and 2, it is seen that the machine includes a loading hopper 1, a fruit flow regulator 2, an elevator or conveyor 3, a feeding device 4 consisting in individual channels 5 which are provided with the conventional braking and protecting device (not shown). At the output of the feeding device 4 there are provided two drums 6 and 7 which have a rotary step by step motion converging towards the cutting element and are provided with cells 8 intended to receive the half fruits.

Figure 3:
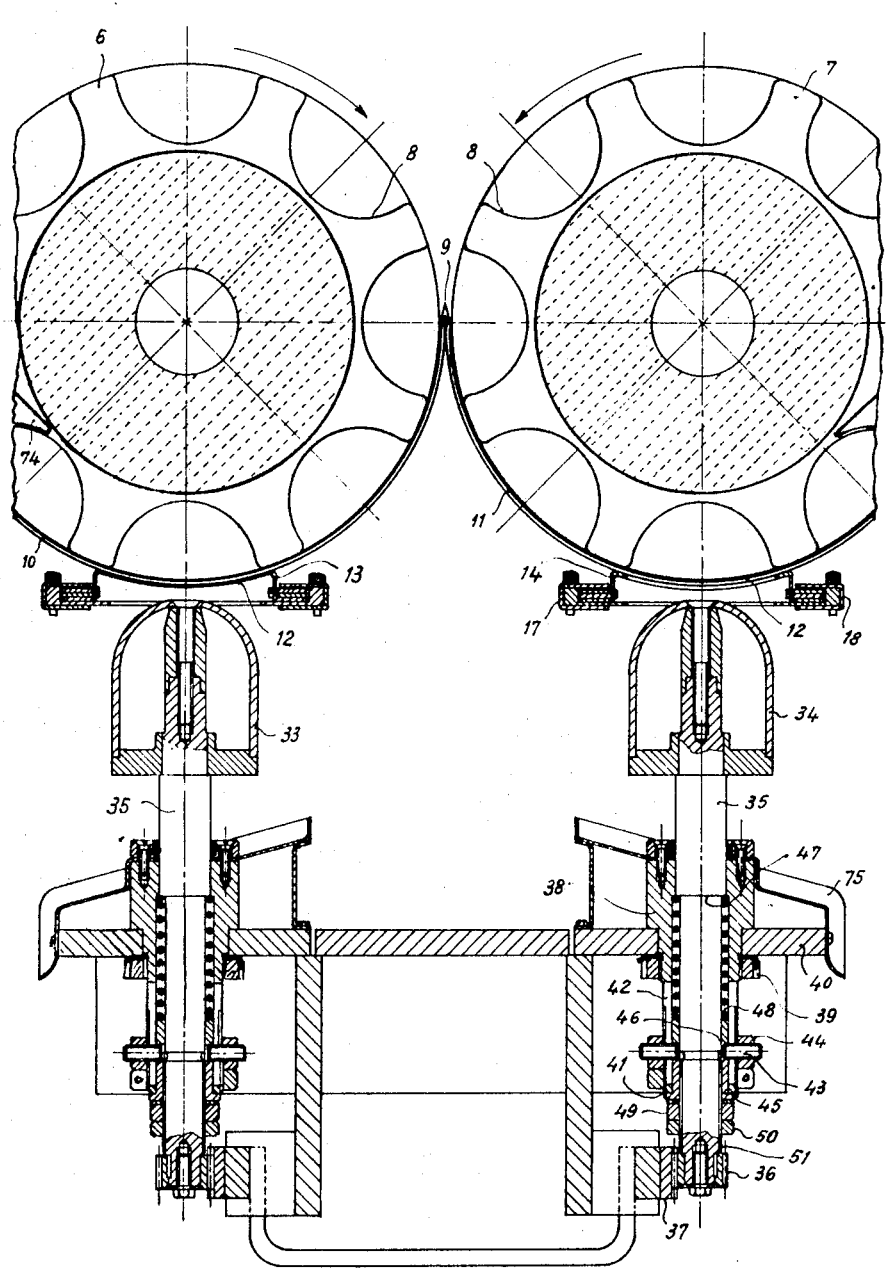
FIG. 3 is a sectional side elevational view, to an increased scale with respect to FIGS. 1 and 2, of the squeezing devices.

As shown in FIG. 3, where the generating lines of the two drums 6 and 7 are closest to each other a cutting device 9 is arranged in the form of a tip of two curved chutes 10 and 11 which extend along a section of the drum circumference for the whole length of the generating line of the drums and are provided at their lower side with a row of holes 12 in register with the row of drum cells 8 which is each time in the lowest position of the drums.

Beneath the holes 12 of each chute 10, 11 there is a fruit holding device 13 and 14 respectively, which is shown in greater detail in FIGS. 4 and 5. Such device comprises two slides 15, 16 movable relatively to each other, in the manner to be described hereinafter, within two longitudinal guides 17, 18. The upper slide 15 is engaged at positions which are spaced to each other by sheet segments 19 having a straight edge 20 and an opposite curved edge 21. Similarly, the lower slide is engaged by sheet segments 22 which are spaced to each other like the segments 19 and also have a straight edge 23 and an opposite curved edge 24. The curved edges 21 of the segments 19 have a concavity opposed to that of the curved edges 24 of the segments 22 and each pair of adjacent segments 19 and 22 is in register with a cell 8 of the drums 6 and 7.

The slide 15 is provided at an end with two shoulders 25 which are engaged by the end of a bell crank 26 pivoted at 27 and subjected at the other end to the action of a thrust member 28 which receives its movement from the driving mechanism of the squeezing member to be described hereinafter.

Similarly, the slide 16 is provided at an end with two shoulders 29 which are engaged by the end of a bell crank 30 pivoted at 31 and subjected at the other end to the action of a thrust member 32 which receives its motion from the central drive of the machine in any suitable manner, not shown.

The squeezing members or bulbs 33, 34 (FIG. 3) are carried each by a shaft 35 having keyed on it at its lower end a pinion 36 meshing with a rack 37. The shaft 35 is supported at its upper part having a larger diameter in a bearing 38 secured by means of a nut 39 screwed on an outer threaded portion of the bearing, to a frame 40 which receives a reciprocating lifting and lowering movement by a central drive of the machine in a manner to be described hereinafter.

The bearing 38 has at its lower side a tubular projection 41 having two longitudinal slots 42 in which two threaded shanks 43 are received which serve to secure to the tubular projection 41, with the aid of nuts 44, a lower bearing 45 for the lower stepped portion of the shaft 35 which is provided with holes 46 for the threaded shanks 43. A spring 48 is arranged between the upper end of the lower bearing 45 and a shoulder 47 on the shaft 35. The bearing 45 is secured axially with respect to the shaft 35 by a nut 49 and a lock nut 50 which are screwed on a lower threaded section 51 of the shaft 35. By screwing to a higher or lesser degree the nut 49 the position of the squeezing members 34 with respect to the frame 40 and therefore the penetration depth of said members into the cells 8 is controlled.

The movement to the racks 37 is given by the mechanism shown in FIGS. 6 and 7.

Referring also to FIG. 1, it is seen that said mechanism comprises a link 52 pivoted at its lower end at 53 on a split collar 54 adapted to be locked in a controllable position on a stub 55 by means of studs 56. The link 52 is pivoted at its upper end at 57 on a carrier 58 adapted to slide by means of bearings 59 in two guides 60 on the frame 40. The link 52 has a longitudinal slot 61 in which engages by means of a roll 62 a forked arm 63 integral with a plate 64.

As shown in FIGS. 1 and 2, said plate 64 is carried by a shaft 65 on which is pivoted one end of a link 66 having the other end in the form of a collar 67 which encompasses an eccentric disc 68 carried by a shaft 69. The latter extends throughout the machine and carries at one end a gear (not shown in FIG. 1) which receives the motion from the motor 70 through a chain 71. For the sake of simplicity there are omitted the individual parts of the driving mechanism which may be of a conventional type and have no interest for this invention.

The shaft 69 transmits the motion through a gearing indicated generally at 72, also to the two drums 6 and 7.

The drums 6 and 7 have circumferentially along the center line of the cells 8 suitable slots in which stripping diaphragms 74 (see FIG. 3) are arranged.

The described machine operates in the following manner:

The penetration depth of the bulbs 33 and 34 into the cells 8 of the drums 6 and 7 is first adjusted by screwing to a higher or lesser degree the nut 49 on the bulb shaft 35. Then the amplitude of the angular motion of the bulbs is adjusted by shifting the collar 54 and securing it in a suitable position on the shaft 55.

By starting the machine the fruits which are loaded into the hopper 1 are distributed orderly by the flow regulator 2 on the elevator or conveyor 3 and unloaded by the latter in the associated channels 5 of the feeding device 4.

At the output of the feeding device 4 any fruit drops in a cell 8 of the drum 6 and is subsequently brought by the two cooperating drums in a position in which it is cut by the blade 9 into two halves which remain in the drum 6 and 7 respectively. Since starting from this time the treatment which the half fruit undergoes in the drum 6 is identical with that of the half fruit in the drum 7 for the sake of simplicity only the process to which the half fruit is subjected in the drum 7 will be described. As it passes from the cutting position to the squeezing position the half fruit in the drum 7 is held in the cell by the chute 11.

When it comes to its lowest position in register with the bulb 34 the half fruit which would tend to fall downwards through the hole 12 in the chute 11, is held in position by the segments 19 and 22 of the slides 15 and 16 which are in a position close to each other and therefore an opening is provided between them which is too small to allow the half fruit to pass therethrough. In such position the drum stops and the members 28 and 32 cause a motion in opposite directions of the slides 15 and 16 which move relative to each other to such extent as to allow the bulbs 34 to pass which are pushed upwards by the motion of the frame 40 and squeeze the half fruits while making simultaneously a slow rotation which is imparted by the meshing between the rack 37 and the pinion 36. By means of this double motion including a penetration and a slow rotation the bulb squeezes the half fruit like in a manual squeezing and the juice extracted drops in the collecting pan 75 which is secured on the frame 40 beneath the bulbs 34, whence it is collected in any suitable manner, not shown. When the bulb has carried out a suitable rotation, for example 150 degrees, it reverses its rotation by virtue of the mechanism 52, 58, 63 and at the same time it lowers drawn by the frame 40 subjected to the drive of the mechanism 66, 68, 69. The members 28 and 32 lower and the slides 15 and 16 return, under the action of the associated springs 76 and 77, in the closed position wherein they are adapted to hold the squeezed half fruit which will be brought in the subsequent position by a one step jerk of the drum 7. The residual rinds of the squeezed half fruits are ejected from the associated cells by the diaphragms 74 which come in contact with them during the subsequent rotation of the drum 7.

The provision of the spring 48 in the stripping members assures an operation without distortions or breaks.

The cells in the drums will preferably have a non smooth surface which will be in any case rough and such as to avoid a rotation of fruit in the cell under the action of the squeezing members.

Obviously, the mechanism required for obtaining the principal motions of the machine can be made by equivalent systems without departing from the basic principle forming an object of this invention.

Generally, while a single embodiment of this invention has been described, it is obvious that a number of changes and modifications can be made without departing from the scope of the invention.

I claim:

1. A machine for extracting juices from citrus fruits comprising a pair of cooperating rotatable drums each provided with a plurality of cooperating cells for receiving the fruits, means for imparting a rotary step by step motion to the drums, means for cutting the fruits in said cells into two halves during movement of the drums, a squeezing member for each respective half of a fruit, means for imparting a straight reciprocating motion to said squeezing members, means for imparting a slow rotary motion to said squeezing members, means for stopping the slow rotary motion of said squeezing members at the end of the squeezing operation of said squeezing members, and a pair of opposed slides arranged for straight reciprocating movement for holding the half fruits in the cells of the respective drums, said slides being movable apart to permit penetration of the squeezing members into the respective cells.

2. A machine as set forth in claim 1 wherein the slides of each pair are shaped and adjustable in such a manner that during movement apart they follow the contour of the moving squeezing member.

3. A machine for extracting juices from citrus fruits which have been cut into two halves and are received in cells in drums having a rotary step by step motion, by means of squeezing members having a straight reciprocating motion, characterized in that the squeezing members have also a slow rotary reciprocating motion, with a stop of the rotation during or at the end of the squeezing step, each squeezing member being carried by a shaft which is supported by a frame having a reciprocating movement, said shaft having a pinion keyed to it which is continuously meshing with a rack adapted to slide on the frame, the stroke of the rack being adjustable starting from zero, and the rack being secured to a carrier to which is pivoted one end of a lever which is pivoted at its other end in an adjustable position, said lever slidably engaging at an intermediate point with the end of an arm fixed to the frame.

References Cited by the Examiner

UNITED STATES PATENTS

| | | | |
|---|---|---|---|
| 783,893 | 2/1905 | Ribert | 100—238 X |
| 2,109,653 | 3/1938 | Scurlock | 146—3.9 |
| 2,533,350 | 12/1950 | Cahill | 100—238 X |
| 2,674,182 | 4/1954 | Kirkpatrick | 100—238 X |
| 2,687,085 | 8/1954 | Koffler | 100—213 X |
| 2,737,989 | 3/1956 | Wurgagt | 146—3 |

FOREIGN PATENTS

| | | |
|---|---|---|
| 833,897 | 3/1952 | Germany. |
| 613,243 | 11/1948 | Great Britain. |

LOUIS O. MAASSEL, *Primary Examiner.*

WALTER A. SCHEEL, *Examiner.*